United States Patent [19]
Walker et al.

[11] 3,856,730
[45] Dec. 24, 1974

[54] POLYMER
[75] Inventors: David John Walker, Epsom, England; Paul Branlard, Grenoble, France
[73] Assignees: BP Chemicals International Limited, London, England; by said Walker; Distugil S. A., Clichy, France; by said Branlard
[22] Filed: Sept. 10, 1973
[21] Appl. No.: 395,982

Related U.S. Application Data
[63] Continuation of Ser. No. 250,980, May 8, 1972, abandoned.

[30] Foreign Application Priority Data
May 14, 1971  Great Britain .................... 14930/71

[52] U.S. Cl. ... 260/27 R, 260/27.6 SB, 260/30.8 R, 260/33.6 UA
[51] Int. Cl. ............................................ C08d 9/12
[58] Field of Search ..... 260/27 R, 30.8 R, 33.8 UA, 260/29.6 SQ

[56] References Cited
UNITED STATES PATENTS

| | | | |
|---|---|---|---|
| 3,261,792 | 7/1966 | Halper et al. ...................... | 260/27 R |
| 3,272,767 | 9/1966 | Howland ........................... | 260/27 R |
| 3,424,705 | 1/1969 | La Heij ............................. | 260/27 R |
| 3,479,311 | 11/1969 | Gorman ........................... | 260/27 R |
| 3,492,276 | 1/1970 | Smith ............................... | 260/27 R |

FOREIGN PATENTS OR APPLICATIONS
858,841  1/1961  Great Britain

*Primary Examiner*—Melvyn I. Marquis
*Assistant Examiner*—William E. Parker
*Attorney, Agent, or Firm*—Brooks Haidt & Haffner

[57] ABSTRACT

Polychloroprene latices having improved "wet strength" are made by polymerising chloroprene in the presence of a water-soluble salt of a mercapto organic carboxylic acid.

8 Claims, No Drawings

POLYMER

This is a continuation, of application Ser. No. 250,980, filed May 8, 1972 now abandoned.

The present invention relates to polychloroprene. It particularly relates to a process for the improvement of the gel strength of polychloroprene produced in latex form.

Throughout this specification the term "polychloroprene" will be used to signify polymers formed by the polymerisation of chloroprene monomer (2-chloro-1,3-butadiene) either alone or in a mixture with a minor proportion of a copolymerisable monomer. Suitable copolymerisable monomers contain at least 1 polymerisable group having the structure

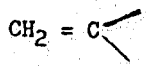

for example, vinyl substituted aromatic compounds, e.g., styrene, vinyl toluenes and vinyl naphthalenes; acrylic and methacrylic acid esters and nitriles, e.g., methyl acrylate and acrylonitrile; and conjugated aliphatic dienes, e.g., 1,3-butadiene, isoprene and 2,3-dichloro-1,3-butadiene. It is preferred to use less than 10 percent by weight of the copolymerisable monomer in relation to the weight of chloroprene monomer initially present.

For most purposes polychloroprene like other rubbery materials is ultimately vulcanised in order to make a final, useful product. However, in the production of many articles, e.g., articles formed by dip coating techniques, it is important that the uncured polychloroprene should have sufficient strength to retain its shape both as a wet gel material and a dry gel material before vulcanisation is effected. This ability to retain strength will be referred to throughout the specification as the "gel strength" of the polymer. Estimates of the gel strength of a polymer are obtained by measuring the tensile strength, the elongation at break and modulus of the unvulcanised material. Another factor in this connection is the permanent set of the unvulcanised material. By this is meant the percentage increase in length of a test piece which has been stretched to its breaking elongation and allowed to recover for ten minutes.

An object of the present invention is to provide a process for the improvement of polychloroprenes in respect of their gel strength properties.

According to the present invention the process for the production of a polychloroprene latex comprises polymerising chloroprene in aqueous emulsion in the presence of a water soluble salt of a mercapto organic carboxylic acid.

The polymerisation of chloroprene under aqueous emulsion conditions is well known and any of these known techniques can be used in the process of the present invention provided that the presence of a water soluble salt of a mercapto organic carboxylic acid does not decrease the stability of the emulsion polymerisation system to such an extent that coagulation of the formed polymer occurs. In this connection it is found that mercapto acids which are unbranched have the least effect on the stability of the polymerisation system.

It is essential to the process of the present invention that the mercapto acid be present during the polymerisation in the form of a water soluble salt because it is found that if it is present as free acid inferior results are obtained. This requirement means that the polymerisation system must be slightly alkaline throughout the polymerisation so as to maintain the mercapto acid in its salt form. In practice it is preferred to carry out the process with the pH of the alkaline medium in the range 10.5 to 12 throughout the polymerisation and most suitably the system contains a sufficient reserve of alkali to ensure that both during polymerisation and in subsequent storage the latex is maintained under alkaline conditions. Any alkali that does not interfere with the polymerisation process may be employed. Potassium and sodium hydroxides are particularly preferred.

The preferred emulsifying agents for use in the process of the present invention are the water soluble salts of rosin acids which are suitably employed in a proportion of 2 to 6 percent by weight on the weight of the monomeric material polymerised. Such emulsifying agents are particularly useful for use in a reaction medium having a pH in the range from 10.5 to 12.

Conventional catalysts for chloroprene polymerisation may be used in the above process, e.g., alkali metal or ammonium persulphates and ferricyanides. Organic hydroperoxides may also be used alone or in admixture with the inorganic persulphates. Catalyst activators and polymerisation modifiers may also be present. Examples of these activators and modifiers are sulphur, the alkyl mercaptans, iodoform, the di-isoalkyl xanthogen disulphides, sodium dithionite or sodium 2-anthraquinone sulphonate. The catalyst, catalyst activators and polymerisation modifiers can each or together be present at the start of the polymerisation or they may be added either separately or together either continuously or incrementally during the polymerisation reaction. In a preferred procedure a modifier such as iodoform is used but its addition to the reaction mixture is delayed until some polymerisation has occurred. Suitably, its addition is delayed until about 40 percent of the chloroprene monomer has been polymerised. A particularly useful modifier system consists of a mixture of iodoform and a di-isoalkyl xanthogen disulphide.

All the chloroprene monomer can be present at the start of the polymerisation or part can be present at the start and the remainder added later during polymerisation.

Polymerisation is preferably carried out at a temperature between 0° and 80°, the preferred range is from 30° to 60°C. Below 0°C the polymerisation is generally too slow for convenience while above 80°C the reaction may be difficult to control. The percentage of monomer converted to polymer is usually between 50 and 100, preferably greater then 85 percent.

Polymerisation may be stopped at any point if desired by the addition of "short stopping" agents, e.g., p-tert-butyl catechol and phenothiazine in quantities of about 0.01 percent of each compound in relation to the weight of chloroprene monomer employed. Small amounts of di-alkyl, di-thiocarbamates such as for example dimethyl ammonium dimethyl dithiocarbamate are equally effective as short stopping agents.

A water soluble salt of any organic carboxylic acid containing one or more mercapto groups i.e., the —SH group can be employed. Examples of suitable acids are thioglycollic acid, which is preferred, 2-mercaptopropionic acid, 3-mercaptopropionic acid, DL-mercaptosuccinic acid and 2-mercaptobenzoic acid. The water soluble salts of these acids may be added to the reaction system as such but most suitably they are prepared in situ by mixing an aqueous solution of a water soluble alkali, e.g., sodium or potassium hydroxide, with the mercapto acid. All the mercapto acid salt is preferably present in the aqueous phase of the emulsion system at the commencement of the polymerisation reaction. However, if desired the mercapto acid can be added to the system either continuously or intermittently throughout the polymerisation process.

The process of the present invention is illustrated by the following examples: Examples 1 to 5

Di-isopropyl xanthogen disulphide modified polychloroprenes in latex form were prepared as follows:

Polymerisation Charge

| | |
|---|---|
| Chloroprene | 100 parts by weight |
| Nilox Wood resin acid as emulsiying agent | 4 do. |
| Di-isopropyl xanthogen disulphide (Dixie) | as indicated in table 1 |
| Thioglycollic acid (TGA) | do. |
| Sodium hydroxide | 1 |
| Daxad 15 (a naphthalene sulphonic acid formaldehyde condension product) | 0.75 |
| Triton-X-200 (a sodium alkyl aryl polyether sulphonate) | 0.25 |
| Water | 90 |

Pumped Catalyst

| | | | |
|---|---|---|---|
| Ammonium persulphate | 0.0005/hr | (initial) 0.005/hr | (final) |
| Sodium 2-anthraquinone sulphonate | 0.00003/hr | (initial) 0.0003/hr | (final) |
| Water | 0.033/hr | (initial) 0.3/hr | (final) |

The catalyst addition rate was increased so as to maintain a constant conversion rate of about 20 percent/hour for the majority of the reaction. The polymerisation was carried out at 40°C under nitrogen; maximum conversion of greater than 95 percent being reached in eight hours.

The resultant rubber was compounded in latex form according to the following recipe:

| Ingredient | Dry Weight |
|---|---|
| Rubber | 100.0 |
| Dinkie clay | 10.0 |
| Antioxidant 2246 (2,2¹-methylene bis (4-methyl-6-tert-butyl phenol)) | 2.0 |
| Zinc oxide | 5.0 |
| Ingredient | Dry Weight |
| Sodium dibutyl dithiocarbamate | 1.0 |
| Tetraethyl thiuram disulphide | 1.0 |

The compounding ingredients were prepared as dispersions by ball milling with suitable stabilisers and added to the latex with stirring. Dipped films were prepared from the latex by dipping glass formers first into a coagulant solution, secondly into the compounded latex and thirdly into coagulant solution. The films were washed (and test pieces cut for wet-gel measurement) or leached for 2 hours at 40°C and dried in an air oven at 45°C for 4 hours to give the uncured products. Curing was carried out in an air oven at 140°C for 30 minutes to give the cured products. The results obtained are shown in Table 1.

EXAMPLES 6 to 9

The process of examples 1 to 5 was repeated but the thioglycollic acid was replaced respectively with mercaptosuccinic acid (example 6) 3-mercaptopropionic acid (example 7), thiosalicylic acid (example 8) and 2-mercaptopropionic acid (example 9). In all cases 0.2 phm of the mercapto acid was employed and the polymerisation of the chloroprene was conducted in the presence of 0.3 phm of di-isopropyl xanthogen di-sulphide (dixie).

EXAMPLE 10

The process of examples 1 to 5 was repeated but the di-isopropyl xanthogen disulphide was replaced by iodoform and the sodium hydroxide was replaced by an equivalent amount of potassium hydroxide.

EXAMPLE 11

The process of example 10 was repeated but the total amount of iodoform employed was reduced and it was added in two equal portions after 1 and 3 hours polymerisation.

The results obtained in examples 1 to 11 inclusive are set out in Table 1.

TABLE 1

| | TGA | Dixie | Uncured Products | | | | | Cured Products | | | | |
|---|---|---|---|---|---|---|---|---|---|---|---|---|
| Example | | | Tensile Strength (MN/m²) | Elongation at Break (%) | Modulus (MN/m²) | | Permanent Set % | Tensile Strength (MN/m²) | Elongation at Break (%) | Modulus (MN/m²) | | Permanent Set (%) |
| | (phm) | (phm) | | | 300 | 600 | | | | 300 | 600 | |
| Control 1 | 0 | 0.3 | 7.9 | 1420 | 0.7 | 1.37 | 140 | 28.6 | 950 | 1.87 | 5.6 | 15 |
| Control 2 | 0 | 0.5 | 3.9 | 1600 | 0.4 | 0.5 | 240 | 29.0 | 1000 | 1.6 | 4.7 | 15 |
| 1 | 0.1 | 0.3 | 10.1 | 1330 | 0.9 | 2.3 | 100 | 28.2 | 950 | 2.0 | 5.8 | 20 |
| 2 | 0.6 | 0.3 | 16.4 | 1100 | 2.3 | 5.6 | 70 | 27.0 | 850 | 2.5 | 7.8 | 10 |
| 3 | 0.4 | 0.5 | 13.3 | 1200 | 1.1 | 3.2 | 70 | 24.4 | 900 | 2.0 | 5.3 | 15 |
| 4 | 0.75 | 0.75 | 10.9 | 1150 | 1.3 | 3.5 | 70 | 23.8 | 850 | 1.8 | 4.6 | 10 |
| 5 | 0.4 | 1.0 | 10.4 | 1300 | 0.8 | 1.8 | 60 | 23.8 | 930 | 1.5 | 3.6 | 5 |
| 6 | | | 12.6 | 1400 | 0.7 | 1.9 | 90 | 28.8 | 900 | 1.8 | 5.0 | 15 |
| 7 | | | 11.1 | 1130 | 1.1 | 3.0 | 90 | 21.7 | 830 | 1.9 | 5.6 | 20 |
| 8 | | | 8.6 | 1600 | 0.5 | 1.1 | 110 | 28.0 | 900 | 1.7 | 4.9 | 15 |
| 9 | | | 10.7 | 1300 | 0.9 | 2.2 | 80 | 25.0 | 900 | 1.8 | 5.1 | 15 |
| 10 | 0.5 | 0.15* | 18.2 | 1400 | 0.3 | 0.8 | 60 | 24.6 | 1000 | 1.6 | 2.5 | 15 |
| 11 | 0.5 | 0.10* | 14.8 | 1300 | 0.6 | 1.4 | 50 | 25.5 | 950 | 1.9 | 3.1 | 5 |

*= Iodoform

We claim:

1. A process for the production of a polychloroprene latex which comprises polymerising chloroprene under alkaline conditions in aqueous emulsion in the presence of a water soluble salt of an unbranched mercapto organic carboxylic acid.

2. A process as claimed in claim 1 wherein a water soluble salt of a rosin acid is employed as the emulsifying agent in the production of the aqueous emulsion.

3. A process as claimed in claim 1 wherein a mixture of iodoform and a di-isoalkyl xanthogen di-sulphide is employed as a modifier for the polymerisation reaction.

4. A process as claimed in claim 1 wherein iodoform is present as a polymerisation modifier and its addition to the reaction mixture is delayed until about 40 percent of the chloroprene monomer has been polymerised.

5. A process as claimed in claim 1 wherein the polymerisation is carried out at a temperature in the range 30° to 60°C.

6. A process as claimed in claim 1 wherein the percentage of chloroprene polymerised is greater than 85 percent.

7. A process as claimed in claim 1 wherein the mercapto organic carboxylic acid is thioglycollic acid.

8. A process as claimed in claim 1, wherein said mercapto organic carboxylic acid is selected from the group consisting of thioglycollic acid, 2-mercapto propionic acid, 3-mercapto propionic acid, DL-mercapto succinic acid, and 2-mercapto benzoic acid.

* * * * *